United States Patent [19]

Early et al.

[11] 4,133,144

[45] Jan. 9, 1979

[54] ABRASIVE DISC OF POLYURETHANE BONDED METALLIC WOOL

[75] Inventors: William E. Early, Orange Park; Michael G. Linn, Jacksonville, both of Fla.

[73] Assignee: The United States of America as represented by the Secretary of the Navy, Washington, D.C.

[21] Appl. No.: 751,308

[22] Filed: Dec. 16, 1976

[51] Int. Cl.² .......................... B24D 3/06; B24D 3/32
[52] U.S. Cl. ........................................ 51/294; 51/295; 51/298 R; 264/128
[58] Field of Search ................. 51/294, 295, 296, 298; 264/111, 128, 134, 136, 137

[56] References Cited

U.S. PATENT DOCUMENTS

| | | | |
|---|---|---|---|
| 1,878,104 | 9/1932 | Brooks et al. | 51/294 |
| 3,410,936 | 11/1968 | Juras | 264/111 |
| 3,529,945 | 9/1970 | Charvat | 51/295 |
| 3,535,832 | 10/1970 | Amero | 51/295 |
| 3,537,121 | 11/1970 | McAvoy | 51/295 |

Primary Examiner—Donald J. Arnold
Attorney, Agent, or Firm—Richard S. Sciascia; Don D. Doty

[57] ABSTRACT

A soft abrasive tool is disclosed as comprising a solid molded mixture of predetermined quantities of an aluminum wool material and a catalyst setting elastomeric polyurethane binder material, the unique combination of which has been mixed, molded under pressure, and cured at room temperature in such manner as to have a disc-like, cup-like, or other predetermined geometrical configuration. A power source — such as a motor or the like — may be used to mechanically drive the aforesaid soft abrasive tool, so that it will cut, grind, and remove polyurethane paint, polysulfide sealant, and other soft coatings from aluminum aircraft skin without damaging the substrate aluminum thereof when held thereagainst.

12 Claims, 5 Drawing Figures

ABRASIVE DISC OF POLYURETHANE BONDED METALLIC WOOL

FIELD OF THE INVENTION

The present invention, in general, relates to abrasives and, in particular, is a soft abrasive disc. In even greater particularity it is an abrasive disc which will remove cured polyurethane paint and polysulfide sealant from a predetermined metallic surface without damaging the metal thereof.

Description of the Prior Art

Heretofore, numerous abrasive papers and discs have been employed for removing various and sundry materials from numerous other various and sundry materials. As a matter of fact, so many abrasive materials are available that the art including them is crowded, indeed. However, although each thereof may be satisfactory for some intended purpose, to date, insofar as is known, none thereof adequately performs the function of removing polyurethane paint and polysulfide sealant from aluminum aircraft surfaces without damaging the metal thereof. Ordinarily, the abrasive discs which have been used for such purposes include abrasive materials which are harder than the aluminum of aircraft skin and, moreover, the abrasives involved are usually in particulate form, thereby causing problems of controlling the density or consistency of the mixture in which they are included. As a matter of fact, it has been found that paint and sealant removal by the known prior art abrasive devices, and especially abrasive discs, can result in an aircraft surface being made more sensitive to corrosion, cracking, and fatigue, as a result of the physical damage done thereto thereby. In addition, the uneven surfaces produced by hard abrasive discs make it difficult, if not impossible, to accomplish ultrasonic inspections thereof. Accordingly, most of the prior art abrasive discs leave something to be desired, as far as the cleaning of aluminum aircraft skin is concerned, and sometimes in other situations, too.

Summary of the Invention

The subject invention overcomes some of the disadvantages of the prior art devices, in that it removes paint and sealant from aluminum aircraft skin without damaging the skin.

Briefly, the invention comprises a soft abrasive tool that is constructed of a compressed mixture of aluminum wool and elastomeric polyurethane and a method for the making thereof.

Therefore, it is an object of this invention to provide a new and unique abrasive tool.

Another object of this invention is to provide a new and unique method of making a new and unique soft abrasive disc.

Still another object of this invention is to provide an improved method and means for removing paint, sealant, and other elements from the aluminum surface of an aircraft and other materials without damaging them.

Brief Description of the Preferred Embodiments

Figure 1:
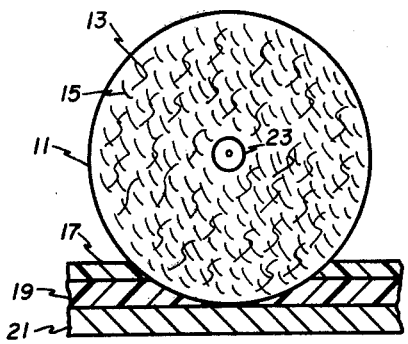
FIG. 1 depicts a side elevational view of the subject abrasive device configured in disc-like form, along with a representation of the metallic surface being cleaned thereby.
Figure 2:
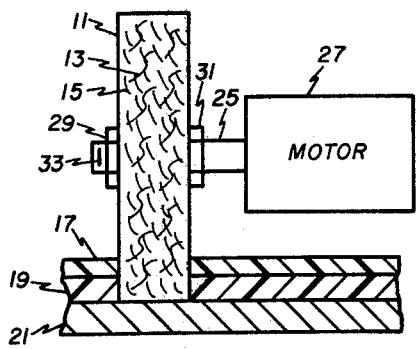
FIG. 2 illustrates a front elevational view of the disc-like abrasive device of FIG. 1, along with the drive motor therefor and the metallic surfaces being cleaned thereby.

Referring now to FIGS. 1 and 2, there is shown a soft abrasive disc 11 which contains a metallic wool matrix 13 impregnated with an elastomeric polyurethane binder 15, both of which have been effectively mixed in such manner as to have a substantially uniform consistency and/or density.

As a general rule, the metal of the aforesaid metallic wool matrix should be selected to be substantially identical to the metal which is to be cleaned or polished by the subject disc 11; however, it should be understood that other metals may be substituted therefor, too. For example, the metal of metallic wool matrix 13 could be harder or softer than the metal of the surface being polished, and, of course, abrasive disc 11 may be used to clean, polish, grind, or the like, any other surface material as necessitated by operational circumstances. Obviously, the harder the metal of metallic wool matrix 13, the more effective it is as a cutting agent. Therefore, it would perhaps be noteworthy that the selection thereof is without limitation and would be well within the purview of the artisan having the benefit of the teachings presented herewith.

The foregoing notwithstanding, since one of the preferred embodiments of the invention is a method and means for removing paint, sealant, and other coatings from the aluminum skin of an aircraft, metallic wool matrix 13 would be an aluminum wool matrix — the aluminum of which is preferably of commercial medium grade with hard temper — which is thoroughly mixed with a polyether type elastomeric polyurethane binder 15 — the elastomeric polyurethane of which is a very abrasion resistant, tough, long-lived material — with the mixture thereof preferably containing (but not limited to) approximately 55 percent aluminum wool and 45 percent elastomeric polyurethane binder by weight.

As previously suggested, because other metallic wool matrixes may be incorporated in the instant invention, metallic wool matrix 13 may, in fact, be a stainless steel wool, while binder 15 may be a polyether type polyurethane material such as, for instance, elastomeric polyurethane, two component ether type catalytic or polyol, air cured. Of course, being harder than aluminum wool, stainless steel wool would be incorporated in abrasive disc 11 when it is desired to polish harder materials, such as steel, for example.

For simplicity of disclosure purposes, FIGS. 1 and 2 both depict abrasive disc 11 cutting a polyurethane paint 17 and a polysulfide sealant 19, and cleaning an aluminum substrate material 21. Obviously, as previously indicated, other materials may be cut and polished thereby, if so desired.

As best seen in FIG. 1, disc 11 has a hole 23 extending therethrough, through which a shaft 25 of a drive motor 27 extends; as best seen in FIG. 2, the latter of which may be, in actuality, an electric, pneumatic drive or other motor, as desired. Disc 11 may, of course, be connected to shaft 25 in any convenient, conventional manner; accordingly, it may be connected thereto by means of a pair of nuts 29 and 31 screwed on threads 33 of the threaded end of shaft 25 in such manner that disc 11 is effectively clamped therebetween and, thus, will be rotated with said shaft 25.

Figure 3:
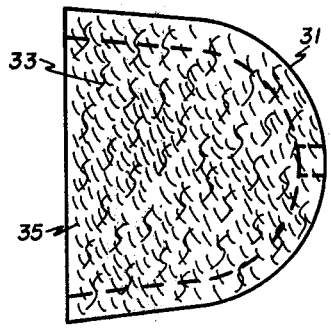
FIG. 3 is a simple elevational view of the subject abrasive device configured in cup-shaped form.

Because it is not intended that the geometrical configuration of the subject invention be limited to the aforementioned disc form 11, a cup-shaped species 31 thereof is illustrated in FIG. 3. Although tailored or configured differently than disc 11, abrasive cup 31 contains the same metallic wool and polyurethane binder in the structure thereof; however, in order to distinguish between the two species, the metallic wool and polyurethane binder thereof have been referenced by numerals 33 and 35, respectively.

At this time, it would appear to be noteworthy that regardless of the geometrical configuration of the subject abrasive device, a key element therein is the matrix or wool configuration of the aluminum or other metal incorporated therein; and when such key abrasive matrix of aluminum material is uniquely combined with the aforesaid polyether type elastomeric polyurethane binder material, a new and highly effective combination of materials comes into existence which constitutes a superior cutting, abrasive, polishing device, indeed, and which certainly facilitates the removal of various types of soils and coatings from various and sundry substrate materials, such as, for example, paint and sealant from aluminum and other metals, tarnish from silver, and barnacles from metals and other materials.

Figure 4:
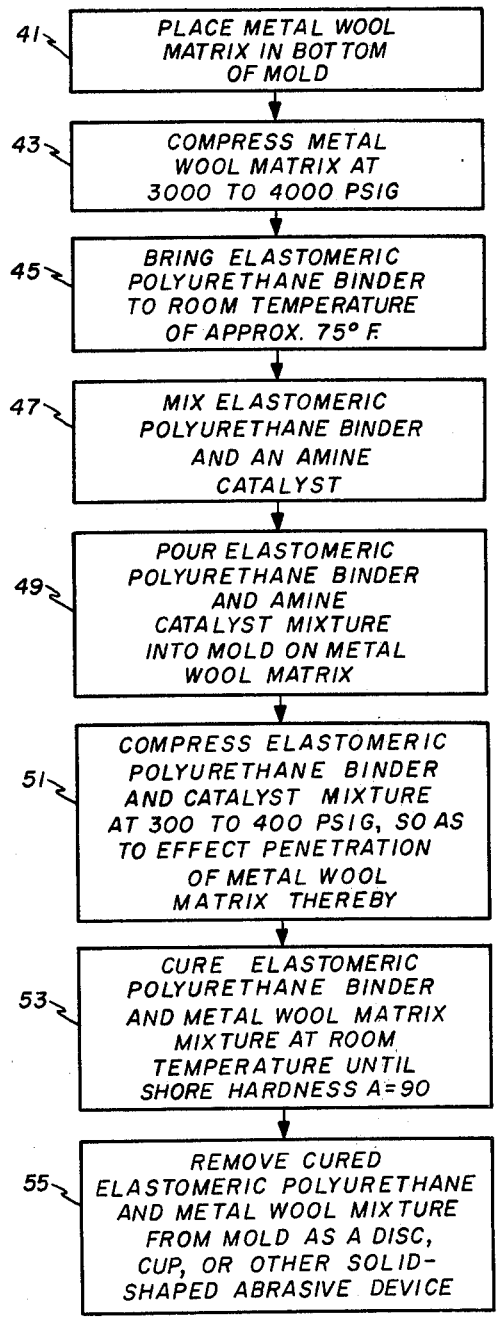
FIG. 4 is a block diagram representation of the method steps employed in the manufacture of the subject soft abrasive device, regardless of its geometrical configuration.

Referring now to FIG. 4, there is disclosed, in representative block form, the preferred steps to be performed in the making of the aforesaid disc 11 or cup 31, as the case may be. Because only the molds will be different, only the method of making soft abrasive disc 11 will be discussed, so as to keep this disclosure as simple as possible.

Hence, the subject abrasive disc 11 may be manufactured by using the following steps:

First, place a commercial medium grade, hard tempered aluminum wool matrix in the bottom of a suitable mold, as indicated in block 41;

Second, compress said aluminum wool matrix against the bottom of said mold at a pressure of, say, 3,000 to 4,000 pounds per square inch gauge, as indicated in block 43;

Third, bring the polyether elastomeric polyurethane binder material to room temperature of approximately 75° F, as indicated in block 45;

Fourth, mix said elastomeric polyurethane binder material with a setting catalyst of the amine catalyst type, as indicated in block 47;

Fifth, pour said elastomeric polyurethane binder and catalyst mixture into the mold on the aluminum wool matrix already deployed therein, as indicated in block 49;

Sixth, compress said elastomeric polyurethane and catalyst mixture at, say, 300 to 400 pounds per square inch gauge, so as to cause the former to impregnate the latter with a substantially uniform consistency and/or density, as indicated in block 51;

Seventh, cure said polyurethane binder and aluminum wool mixture at room temperature until it becomes a solid disc (or other shape) having approximately a "Shore hardness A" of 90, as indicated in block 53; and Eighth, remove the cured elastomeric polyurethane and aluminum wool matrix disc from the aforesaid mold, as indicated in block 55.

Figure 5:
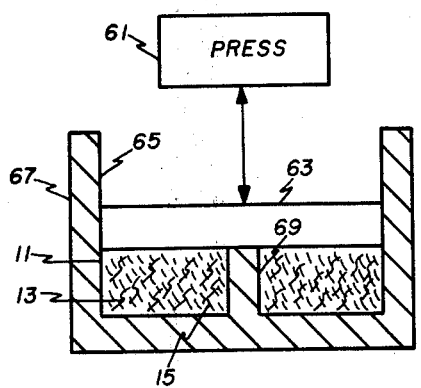
FIG. 5 is an elevational view, partly in cross-section, of the apparatus which may be used to construct the disc-like configuration of the subject abrasive device.

As best seen in FIG. 5, which, of course, is representative only, there is shown a press 61 of any appropriate conventional type which is connected to a suitable piston 63 adapted for traveling within the cylinder portion 65 of a suitable mold 67. Hence, those method steps of FIG. 4 requiring compression — as indicated in blocks 43 and 51 — may be implemented by using such arrangement, if so desired. Thus, disc 11 (comprising aluminum wool 13 and polyurethane binder 15) is formed therein. But, in the particular configuration of disc 11 shown in FIGS. 1 and 2, a hole 23 extends therethrough; therefore, mold 67 contains a center post 69 which causes said hole 23 to be made during the compression and curing process. Preferably, the length of post 69 should be equal to the width desired for disc 11, so that said hole 23 will extend therethrough when disc 11 is in its finished form.

MODE OF OPERATION

The operation of the subject invention will now be discussed briefly in conjunction with all of the figures of the drawing.

When disc 11 is removed from its mold, as referenced in FIGS. 4 and 5, respectively, it is ordinarily connected to the shaft of drive motor 27 in the manner shown in FIG. 2. Then, while being rotatably driven by motor 27, abrasive disc 11 is held (by hand or otherwise) against the material or materials desired to be cut, removed, and/or polished. In this particular case, as best seen in FIGS. 1 and 2, paint 17 and sealant 19 are ground away — since the cohesive strength thereof is less than that of aluminum — while aluminum 21 — that is, the aluminum skin of an aircraft — becomes polished. And because the cutting element of disc 11 is a matrix of aluminum wool, the aforesaid substrate aluminum 21 is polished without any significant damage thereto, as far as loss of strength, cracking, fatigue, or the like, are concerned. Hence, said substrate aluminum (or other material) is put into a condition which facilitates inspection, rework, refinishing, or other operations to be performed thereon.

Again, for purpose of emphasis, it is hereby mentioned that the metal of the wool matrix should preferably be the same as the substrate metal to be polished if said substrate metal is to be polished or have the coatings thereon, if any, removed therefrom without damage thereto. Nevertheless, other metals or materials in matrix form may be substituted therefor by the artisan without violating the spirit or scope of this invention.

In view of the foregoing, it may readily be seen that an improved soft abrasive tool and a unique method for making same have been invented which, as a consequence of the improved results produced thereby, constitute an advancement in the abrasives art.

Obviously many modifications and variations of the present invention are possible in the light of the above teachings. It is, therefore, to be understood that within the scope of the appended claims the invention may be practiced otherwise than as specifically described.

What is claimed is:

1. An abrasive tool for removing a predetermined coating from an aluminum surface without damage thereto, consisting of:

an abrasive matrix of metallic wool having a hardness that is slightly less than the aluminum surface from which said predetermined coating is to be removed but greater than that of said predetermined coating to be removed;

a room temperature cured elastomeric polyurethane, two component ether type polyol binder mixed uniformly with said abrasive mixture of metallic wool;

said abrasive matrix of metallic wool and the aforesaid room temperature cured elastomeric polyurethane, two component ether type polyol binder being uniformly mixed in proportions of fifty-five percent and forty-five percent by weight, respectively; and a predetermined amine catalyst mixed with said room temperature cured elastomeric polyurethane, two component ether type polyol binder in such manner as to expeditiously effect the setting thereof after said room temperature cured elastomeric polyurethane, two component ether type polyol binder has been mixed with the aforesaid abrasive matrix of metallic wool and in such manner as to effect a predetermined solid disc thereof upon the setting thereof.

2. The abrasive tool of claim 1, wherein said matrix of metallic wool comprises a matrix of aluminum wool.

3. The abrasive tool of claim 1, wherein said matrix of metallic wool comprises a matrix of stainless steel wool.

4. An abrasive device of predetermined geometric configuration for removing coatings from a given metal surface without damage thereto, consisting of a molded mixture of:

an aluminum wool matrix;

an elastomeric polyurethane, two component ether type polyol binder impregnating said aluminum wool matrix;

said elastomeric polyurethane, two component ether type polyol binder and aluminum wool matrix being mixed in proportions of forty-five and fifty-five percents by weight, respectively; and an amine catalyst mixed with said elastomeric polyurethane, two component ether type polyol binder for effecting the timely setting thereof with a Shore hardness A of 90 at room temperature.

5. The abrasive device of claim 4, wherein the geometrical configuration thereof is a disc.

6. The abrasive device of claim 4, wherein the geometrical configuration thereof is a cup.

7. A method of making a soft abrasive tool, consisting of the steps:

placing a predetermined quantity of metal wool in the bottom of a mold having a predetermined geometrical configuration;

compressing said metal wool in the bottom of said mold with a pressure of the order of three thousand pounds per square inch gauge;

bringing an elastomeric polyurethane binder material to a room temperature of the order of 75° F.;

mixing said elastomeric polyurethane binding material with a predetermined setting effecting amine catalyst;

pouring a predetermined quantity of said elastomeric polyurethane binder material and catalyst mixture into the mold containing the aforesaid metal wool and on said metal wool in such manner that the proportions thereof are forty-five percent binder material and fifty-five percent metal wool by weight;

compressing said elastomeric polyurethane binder material and catalyst mixture with a pressure of the order of three hundred pounds per square inch gauge, so as to effect the uniform impregnation of said metal wool thereby in such manner as to form a uniform mixture thereof;

curing said elastomeric polyurethane binder material and metal wool mixture at room temperature until a predetermined hardness is obtained therein; and removing said cured elastomeric polyurethane binder material and metal wool mixture from the aforesaid mold.

8. The method of claim 7, wherein said metal wool is an aluminum wool.

9. The method of claim 7, wherein said metal wool is a stainless steel wool matrix.

10. The method of claim 7, wherein the predetermined geometrical configuration of said mold is disc-shaped.

11. The method of claim 7, wherein the predetermined geometrical configuration of said mold is cup-shaped.

12. An abrasive tool of predetermined disc configuration for removing coatings from an aluminum surface without damaging the substrate thereof, comprising in combination:

a matrix of aluminum wool, the aluminum of which is softer than the aluminum surface from which the aforesaid coatings are to be removed;

a two-component ether-type polyol elastomeric polyurethane binder mixed uniformly with said matrix of aluminum wool;

said matrix of aluminum wool and the aforesaid two-component ether-type poly elastomeric polyurethane binder being mixed in proportions of the order of fifty-five percent aluminum wool and forty-five percent two-component ether-type poly elastomeric polyurethane binder by weight, respectively, and in such manner as to effect a disc geometrical configuration thereof;

an amine catalyst mixed with said two-component ether-type polyol elastomeric polyurethane binder in such manner as to effect the setting thereof at a predetermined time after said two-component ether-type polyol elastomeric polyurethane has been mixed with the aforesaid matrix of aluminum wool.

* * * * *